TELEPHONE TONE RINGER
Filed Nov. 10, 1964
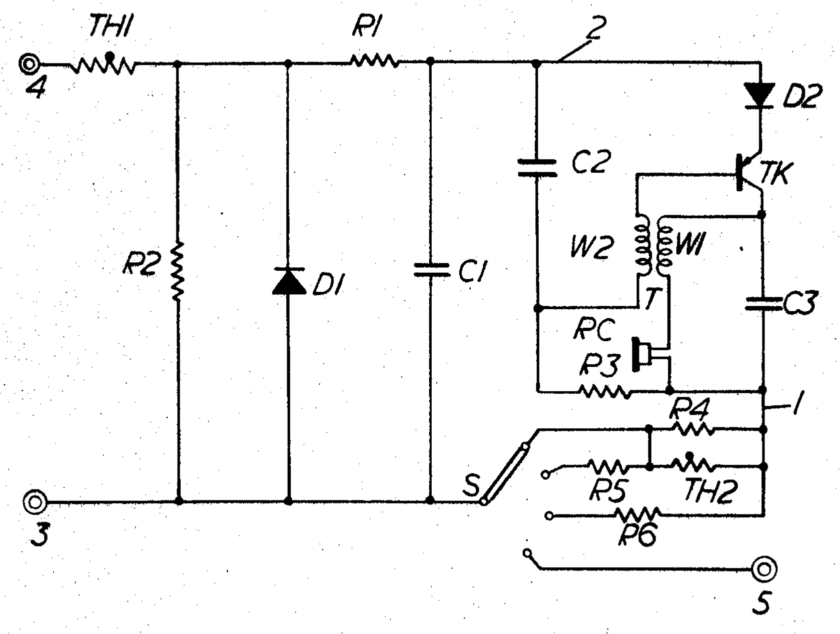

United States Patent Office
3,387,097
Patented June 4, 1968

3,387,097
TELEPHONE TONE RINGER

Anthony Crisp Beadle and Ralph William Parrish, London, England, assignors to International Standard Electric Corporation, New York, N.Y., a corporation of Delaware Filed Nov. 10, 1964, Ser. No. 410,220
Claims priority, application Great Britain, Nov. 27, 1963, 46,851/63
9 Claims. (Cl. 179—84)

ABSTRACT OF THE DISCLOSURE

A telephone tone ringer comprising a transistorized oscillator energized by low frequency ringing currents. The output of the oscillator circuit is coupled to a transducer. The application of the low frequency ringing current is controlled by a pair of thermistors. The first thermistor is used to delay the application of the full volume of audible calling signals while the second thermistor is used to prevent noise signals from unduly biasing the first thermistor to thereby cancel out the beneficial effects of the first thermistor.

The present invention relates to a telephone tone ringer, and more particularly tone ringers of the type in which the conventional low frequency ringing currents are used to energise an oscillator circuit to generate a higher frequency tone signal which is applied to an electro-acoustic transducer to attract the attention of a called telephone subscriber in a more pleasant manner than, for example, by a conventional magneto bell operated directly by said ringing currents.

In some circumstances, the full volume of the audible calling signal may be rather greater than necessary to attract the attention of the subscriber, who may be in close proximity to his set or extension set, and at the same time sufficiently great to be a nuisance to other persons, who, for one reason or another, do not intend to engage in a telephone conversation using the set to which a ringing signal is being applied. One example of such circumstances is a large office, in which a number of clerical employees are accommodated and each has an individual extension set on a desk at which he is ormally seated; another example is a private residence, in which the set is usually located in or near one of the reception rooms and in which one or more members of the household may be sleeping in a bedroom. In such circumstances, the purpose of the calling signal may be adequately served with the minimum of nuisance to persons other than the one who is to answer the call, by a calling signal which is arranged to build up in volume from an initially low value to its full volume over a period of the order of 10 to 30 seconds.

According to the invention, there is provided a telephone tone ringer comprising a transistor oscillator circuit adapted to be energised by energy derived from low frequency ringing currents applied in bursts of currents at a predetermined cadence, and comprising circuit means for applying said energy to said oscillator circuit at a rate increasing during the initial bursts of said ringing currents, wherein said circuit means comprises a thermally sensitive resistor connected in series with said oscillator circuit, and wherein said thermally sensitive resistor has a negative temperature coefficient of resistance and a heating time constant greater than twice the period of said cadence.

An embodiment of the invention will now be described with reference to the accompanying drawing in which there is shown a diagram of the circuit arrangement of a telephone tone ringer in accordance with the invention.

In the preferred embodiment, the telephone tone ringer comprises three principal parts, namely a tone generator comprising a transistor oscillator circuit and an electro-acoustic transducer, circuit means for varying the rate at which energy is applied to the oscillator circuit during the first few series of bursts of low frequency ringing currents applied to a further circuit means for receiving these ringing currents and deriving or modifying their energy in a manner in accordance with the desired performance of the tone ringer.

In the accompanying drawing, the points in the circuit diagram indicated by the reference numerals 1 and 2 represent the two poles of the tone generator arrangement and the terminals marked 3 and 4 are the input terminals of the telephone tone ringer. The aforementioned circuit means is shown as a two pole network connected between point 1 and terminal 3 and the aforementioned further circuit means is shown as a four pole network deriving its input between terminals 3 and 4 and delivering its output between point 2 and a point electrically in common with terminal 3.

The telephone tone ringer may be used in place of the conventional magneto bell and replace the bell sound by a tone having a fundamental frequency in the range of 1200 to 2400 cycles per second, the tone being modulated or warbled at the low frequency of the ringing currents, which is usually 16⅔ cycles per second but may be as high as 50 cycles per second. The warbled tone is also interrupted at the usual ringing cadence, which in the United Kingdom consists of "on"—periods of 0.4 second each, separated by "off"—periods which are alternately 0.2 second and 2 seconds in duration.

The tone generator includes an electro-acoustic transducer RC, which in the preferred embodiment is of the rocking armature type. The transducer is preferably constructed to have a relatively small degree of acoustic damping and to be resonant at or near the frequency of the tone signals generated by the transistor oscillator. In the preferred embodiment, the tone frequency is approximately 1700 cycles per second. To enhance the acoustic output of the transducer, it may be provided with a short tuned horn at its frontal aperture.

The oscillator circuit includes a transistor TK, a transformer T for providing regenerative coupling between the base and collector electrodes of the transistor TK, a capacitor C3 for tuning the operating frequency of the oscillator circuit, a diode D2 for providing a current dependent degree of negative feedback, a biassing resistor R3 and a capacitor C2 which serves to decouple the base electrode from voltages at the tone frequency applied via the resistor R3 and to couple the base electrode to alternating components of the voltage which may be transmitted to the point 2 by the energy input circuit. The collector electrode is connected to point 1 via the series combination of the transducer RC and the primary winding W1 of the transformer T; this series combination is shunted by the tuning capacitor C3. The base electrode of the transistor TK is connected via the feedback winding W2 of the transformer T to the junction of the resistor R3 and the capacitor C2, coupling this junction to the points 1 and 2, respectively. The emitter electrode of the transistor TK is connected to point 2 via the diode D2, which has its preferred direction of conduction in the same sense as the emitter-base junction of the transistor TK. The diode D2, by virtue of the non-linearity of its resistance in the initial portion of its forward characteristic, serves to reduce the tendency of the oscillator circuit to respond to and in effect be energised into erroneous operation by dialling pulses, random noise pulses appearing on the external telephone line or other forms of interference.

The circuit means for varying the rate of energy input to the oscillator circuit has a thermally sensitive resistor TH2 or thermistor as its principal component and further includes manually operable means such as switch S for varying the value of resistance of the network of resistive elements, such as R4 and R5 in which the thermistor TH2 is connected in order to obtain the combined effect of the heating time constants and the negative temperature coefficient of the thermistor to varying degrees and to control the volume of tone produced by the tone generator. In the preferred embodiment, the switch S has four positions, which are hereinafter referred to as the "loud," "medium," "soft" and "off or extension" positions. As shown in the accompanying drawing, the switch is in the "loud" position, in which it connects terminal 3 of the tone ringer to the aforementioned point 1 via the parallel combination of the thermistor TH2 and the resistor R4, which serves to limit the maximum value of resistance the combination can attain when the thermistor TH2 is at a relatively low temperature in the absence of internal heating due to current flowing through it. The next position of the switch S, in clockwise direction as shown in the circuit diagram, is the "medium" position, in which the resistor R5 is connected in series with the parallel combination of the resistor R4 and the thermistor TH2. In an alternative embodiment, the switch S is omitted and the resistor R5 is a normally variable resistor connected in series with the thermistor TH2 to provide a means of varying the volume of the tone emitted by the transducer RC. In the "loud" and "medium" positions of the switch S, the thermistor TH2 is effective to produce a voltage drop decreasing from an initially high value to a relatively low value. The thermal characteristics of the thermistor TH2 are so chosen, that its resistance attains its asymptotic low value after at least three repetitions of the cadence of bursts of the low frequency ringing currents applied to the input terminals of the tone ringer. In the third, i.e. "soft" position of the switch S, the input terminal 3 is connected to the point 1 via the fixed resistor R6 and the effects obtainable by the use of the thermistor TH2 are dispensed with. In the fourth position of the switch S, the input terminal 3 is disconnected from the tone generator, i.e. the latter is switched off, and is connected instead to a terminal 5, in which a further tone generator, may be connected. This further tone generator may be located remotely from the one hereinbefore described and differ from it in details of construction and mode of operation. The circuit for this further tone generator is completed by a further connection made as appropriate either to point 2 in the circuit diagram or the other one of the two input terminals, i.e. terminal 4.

The four pole network of the aforementioned further circuit means of the preferred embodiment comprises a thermistor TH1, resistors R1 and R2, a diode D1 and a capacitor C1. The thermistor TH1 is, in effect, connected in series with the transistor oscillator circuit and is chosen to have a heating time constant shorter than the period of the cadence, thereby enhancing the effect of the diode D2 in reducing the tendency of the oscillator circuit to respond in an erroneous manner to noise pulses. The resistor R2 is connected in parallel with the input to the tone ringer and serves to improve the performance of a magneto bell which may, if so required, be operated in a series connection with the tone ringer. The diode D1 is used as a half-wave shunt rectifier to suppress those half-waves of the ringing circuit, which would be of the wrong polarity for normal forward operation of the transistor TK. The diode D1, in the preferred embodiment, serves to make the quality of the generated tone more pleasant subjectively and to reduce the stresses applied to the diode D2 and transistor TK by excessive reverse voltages. The series-connected resistor R1 and the shunt-connected capacitor C1 co-operate to provide a low pass filter network to attenuate the harmonics of the rectifier output to some degree, thereby resulting in a more pleasing quality in the reproduced tone. In the preferred embodiment, the time constant of this filter is approximately 2 milliseconds.

It is to be understood that the foregoing description of specific examples of this invention is made by way of example only and is not to be considered as a limitation on its scope.

What we claim is:

1. A telephone tone ringer comprising a transistorized oscillator circuit adaptable to be energized by energy derived from a source of low frequency ringing currents applied in bursts of current at a predetermined cadence, transducer means connected to the output of said oscillator for converting the oscillator output to audible signals, circuit means for applying said energy to said oscillator circuit at a rate increasing during the initial bursts of said ringing currents, said circuit means comprising a first thermistor connected in series between said energy source and said transducer, said first thermistor having a negative temperature coefficient of resistance and a heating time constant greater than twice the period of said cadence, further circuit means connected to said source of low frequency ringing currents and to said circuit means, said further circuit means comprising a diode rectifier means for producing bursts of unidirectional current in response to bursts of said ringing currents applied thereto and said further circuit means further comprising second thermistor means having a negative temperature coefficient of resistance and heating time constant shorter than the period of said cadence connected between said source of low frequency ringing current and said diode rectifier means.

2. A telephone tone ringer as claimed in claim 1 wherein said circuit means comprises a resistive device connected in series with said thermistor, and manually operable means for varying the value of resistance of said resistive device.

3. A telephone tone ringer as claimed in claim 1 wherein said transistor oscillator circuit is a two pole circuit comprising a single transistor and a capacitor tuned transformer, means for connecting the collector electrode of said transistor via the serial connection of a first winding of said transformer and said transducer to the first of said two poles, means for connecting the base electrode of said transistor via a second winding of said transformer to the first of said two poles, and means for connecting the emitter electrode of said transistor to the second of said two poles, the sense of said first and second winding being such as to provide regenerative coupling at the tone frequency between said base electrode and said collector electrode.

4. The telephone tone ringer as claimed in claim 3 wherein said tuning capacitor is connected between said collector and said first pole bridging the series connection of said first winding and said transducer.

5. A telephone tone ringer as claimed in claim 3 comprising biasing resistor means connecting said second winding to said first pole, coupling capacitor means connecting said second winding to said second pole, and wherein the reactance of said coupling capacitor at said low frequency is numerically smaller than the resistance of said biasing resistor.

6. A telephone tone ringer as claimed in claim 3 comprising diode means connecting said emitter electrode to said second pole and said diode means having its preferred direction of conduction in the same sense as the emitter-base junction of said transistor.

7. A telephone tone ringer as claimed in claim 3 wherein said circuit means is directly connected to said first pole.

8. A telephone tone ringer as claimed in claim 7 wherein said further circuit means comprises a low pass filter network interposed in the path of said unidirectional current between said rectifier diode and said oscillator circuit.

9. A telephone tone ringer as claimed in claim 7, comprising a plurality of resistive devices having differing values of resistance, a terminal, which is connectable to a further oscillator circuit, a manually operable switching means for selectably connecting said further circuit means to said oscillator circuit via a selected one of said plurality of resistive devices or to said terminal.

References Cited

UNITED STATES PATENTS

| | | | |
|---|---|---|---|
| 2,589,800 | 3/1952 | Goodale et al. | 179—81 |
| 3,164,680 | 1/1965 | Adelaar et al. | 179—84 |
| 3,227,813 | 1/1966 | Talcott | 179—84 |

KATHLEEN H. CLAFFY, *Primary Examiner.*

H. ZELLER, *Assistant Examiner.*